US007762883B2

(12) United States Patent
Griswold et al.

(10) Patent No.: US 7,762,883 B2
(45) Date of Patent: Jul. 27, 2010

(54) RANDOM NUMBER GENERATOR BASED ROULETTE WHEEL

(75) Inventors: Chan Griswold, Reno, NV (US); Harold E. Mattice, Gardnerville, NV (US); Chris Gadda, Las Vegas, NV (US); Richard Wilder, Sparks, NV (US); James Stockdale, Clio, CA (US)

(73) Assignee: IGT, Reno, NV (US)

( * ) Notice: Subject to any disclaimer, the term of this patent is extended or adjusted under 35 U.S.C. 154(b) by 660 days.

(21) Appl. No.: 11/713,163

(22) Filed: Mar. 1, 2007

(65) Prior Publication Data

US 2008/0214264 A1 Sep. 4, 2008

(51) Int. Cl.
*A63F 13/00* (2006.01)
*A63F 5/00* (2006.01)

(52) U.S. Cl. ........................ 463/17; 463/25; 273/138.2; 273/139; 273/274; 273/309

(58) Field of Classification Search ....................... None
See application file for complete search history.

(56) References Cited

U.S. PATENT DOCUMENTS

| | | | | | |
|---|---|---|---|---|---|
| 497,906 | A | | 5/1893 | Bettini | |
| 3,819,186 | A | * | 6/1974 | Hinterstocker | 463/17 |
| 4,260,159 | A | | 4/1981 | Hoffman | |
| 4,337,945 | A | | 7/1982 | Levy | |
| 4,357,659 | A | | 11/1982 | Nathans | |
| 4,391,442 | A | | 7/1983 | Levy | |
| 4,396,193 | A | * | 8/1983 | Reinhardt et al. | 463/22 |
| 4,643,425 | A | | 2/1987 | Herzenberger | |
| 4,906,005 | A | * | 3/1990 | Manabe | 463/22 |
| 5,106,091 | A | * | 4/1992 | Comito | 463/22 |
| 5,259,616 | A | | 11/1993 | Bergmann | |
| 5,489,101 | A | | 2/1996 | Moody | |
| 5,531,448 | A | | 7/1996 | Moody | |
| 5,540,442 | A | * | 7/1996 | Orselli et al. | 463/17 |
| 5,588,650 | A | * | 12/1996 | Eman et al. | 273/142 B |
| 5,601,488 | A | | 2/1997 | Kadlic | |
| 5,636,838 | A | * | 6/1997 | Caro | 273/142 E |
| 5,755,440 | A | * | 5/1998 | Sher | 273/142 E |

(Continued)

FOREIGN PATENT DOCUMENTS

| | | |
|---|---|---|
| GB | 2398511 | 8/2004 |

OTHER PUBLICATIONS

"Jamie Papp VP of Slot Operations for Wynn Las Vegas, has surprises in store for players", Strictly Slots, Nov. 2005, pp. 22-25.

(Continued)

*Primary Examiner*—M. Sager
(74) *Attorney, Agent, or Firm*—Weaver Austin Villeneuve & Sampson LLP

(57) ABSTRACT

The invention provides for the use of a random number generator in a roulette wheel to play a game of roulette. The gaming apparatus may have a random number generator, a roulette wheel, and means for controlling the roulette wheel to indicate a first winning number corresponding to a first random number generated by the random number generator. The roulette wheel may have a top ring, outer ring, separator ring, and an inner ring and each ring may be decoupled from each outer to spin in different directions.

37 Claims, 10 Drawing Sheets

U.S. PATENT DOCUMENTS 5,775,992 A 7/1998 Wood et al.
5,775,993 A * 7/1998 Fentz et al. .................. 463/17
5,816,915 A 10/1998 Kadlic
5,836,583 A 11/1998 Towers
5,845,907 A 12/1998 Wells
5,853,325 A 12/1998 Kadlic
5,879,235 A * 3/1999 Kaneko et al. ................ 463/34
6,036,190 A 3/2000 Edmunds et al.
6,043,483 A 3/2000 Schreiber
6,048,267 A 4/2000 Wichinsky
6,102,402 A 8/2000 Scott et al.
6,129,357 A 10/2000 Wichinsky
6,132,311 A 10/2000 Williams
6,135,882 A 10/2000 Kadlic
6,146,271 A 11/2000 Kadlic
6,162,121 A 12/2000 Morro et al.
6,179,293 B1 1/2001 Hedman
6,283,858 B1 9/2001 Hayes, Jr. et al.
6,358,144 B1 3/2002 Kadlic et al.
6,369,727 B1 4/2002 Vincze
6,371,483 B1 4/2002 Edmunds et al.
6,379,245 B2 4/2002 De Keller
6,443,456 B1 9/2002 Gajor
6,533,279 B2 3/2003 Moody et al.
6,533,644 B1 3/2003 Horie et al.
6,536,768 B2 3/2003 Caputo
6,536,769 B1 3/2003 Palacios et al.
6,565,434 B1 5/2003 Acres
6,572,473 B1 6/2003 Baerlocher
6,572,475 B1 6/2003 Okabe et al.
6,605,000 B2 8/2003 Adams
6,616,530 B2 9/2003 Pearce et al.
6,637,746 B1 10/2003 Baranauskas
6,645,077 B2 11/2003 Rowe
6,685,567 B2 2/2004 Cockerille et al.
6,705,943 B2 3/2004 Awada
6,749,501 B2 6/2004 Crawford
6,758,749 B2 7/2004 Krintzman
6,780,103 B2 8/2004 Bansemer et al.
6,793,577 B1 9/2004 Wilkins et al.
6,805,353 B2 10/2004 Williams
6,826,607 B1 11/2004 Gelvin et al.
6,827,646 B2 12/2004 Adams
6,835,133 B2 12/2004 Baerlocher et al.
6,905,411 B2 6/2005 Nguyen et al.
6,910,964 B2 6/2005 Acres
6,918,830 B2 7/2005 Baerlocher
6,932,706 B1 8/2005 Kaminkow
6,935,958 B2 8/2005 Nelson
6,942,568 B2 9/2005 Baerlocher
6,994,626 B1 2/2006 Van Enschut
7,011,581 B2 3/2006 Cole et al.
7,014,560 B2 3/2006 Glavich et al.
7,048,629 B2 5/2006 Sines et al.
7,048,630 B2 5/2006 Berg et al.
7,155,710 B2 12/2006 Breckner et al.
7,166,526 B2 1/2007 Kim
7,169,052 B2 1/2007 Beaulieu et al.
2002/0107059 A1 8/2002 Katayama
2002/0142825 A1 10/2002 Lark et al.
2002/0187823 A1 12/2002 Khal
2003/0003988 A1 1/2003 Walker et al.
2003/0032474 A1 2/2003 Kaminkow
2003/0073478 A1 4/2003 Kovacs
2003/0199295 A1 10/2003 Vancura
2004/0017043 A1 1/2004 Moody
2004/0058727 A1 3/2004 Marks et al.
2004/0075216 A1 4/2004 Moody
2004/0254011 A1 12/2004 Muskin
2005/0029745 A1 2/2005 Walker et al.
2005/0054441 A1 3/2005 Landrum et al.
2005/0059481 A1 3/2005 Joshi et al.
2005/0085296 A1 4/2005 Gelb et al.
2005/0148384 A1 7/2005 Marks et al.
2005/0164759 A1 7/2005 Smith et al.
2005/0164762 A1 7/2005 Smith et al.
2005/0192081 A1 9/2005 Marks et al.
2005/0255919 A1 11/2005 Nelson
2005/0261048 A1 11/2005 Evans
2005/0288096 A1 12/2005 Walker et al.
2006/0019746 A1 1/2006 Seelig et al.
2006/0025193 A1 2/2006 Gail et al.
2006/0063584 A1 3/2006 Brill et al.
2006/0068875 A1 3/2006 Cregan et al.
2006/0111171 A1 5/2006 Berg et al.
2006/0178182 A1 8/2006 Sines et al.
2006/0183537 A1 8/2006 Dickerson
2006/0249899 A1 11/2006 Lease

OTHER PUBLICATIONS

"Keystone Cash—Players break the bank for loads of bonus loot!", GTECH Architects of Gaming, GTECH Corporation, 2004, 2 pages.

* cited by examiner

RANDOM NUMBER GENERATOR BASED ROULETTE WHEEL

FIELD OF THE INVENTION

The present invention relates to a roulette wheel. More particularly, the present invention relates to the use of a random number generator with a roulette wheel.

BACKGROUND OF THE INVENTION

Roulette is a well-known casino game that has been played for many years. A typical conventional roulette game includes a table bearing, a felt covering upon which indicia forming a betting layout has been silk-screened or otherwise imprinted. A wheel is mounted in an assembly called a bowl. The wheel is rotatably mounted on a main spindle at the center of the bowl. The bowl comprises a circular ball track near its outer diameter in which the roulette ball revolves around the spindle and a lower track that slopes from the ball track downwardly to the outer diameter of the wheel. In an outer ring of the wheel is a band containing outward facing numbers. In registration with each number is a receiving slot in a separator ring. Each ball slot may include a pad to damp motion of the ball, and the receiving slots are separated by radially disposed separators.

In operation of a typical roulette game, players place chips or tokens on the betting layout located on the roulette table, and then the dealer spins the roulette wheel to place the ball in motion about the circular ball track. The inner ring and separator ring rotate together as one unit. As the wheel slows, the ball moves radially inwardly and comes to rest in one of the slots. After the ball comes to rest in one of the slots, the dealer settles the various wagers placed on the table layout in accordance with predetermined rules and wager odds and the process is repeated. In electronic roulette games, air may be used to eject the ball onto the roulette wheel.

Winners, losers, and odds of payoffs are determined in accordance with the number. The modern roulette wheel contains 36 integers from 1 through 36. The "American" roulette wheel additionally has a 0 and a 00. The "French" or "European" wheel has 36 numbers and only a single zero. The zeros are typically marked on green backgrounds. The integers are each "red" or "black". In the outward facing numbers, groups of numbers and each color are spaced out in a mathematically balanced fashion. In the American wheel, the numbers 0 and 00 are directly opposite each other in the outward facing number band. The colors alternate around the wheel and odd numbers alternate with even numbers. The sum of each two successive numbers of the same color must equal 37. There are two exceptions, namely the numbers 9 and 28 and the numbers 10 and 27. These pairs are not of the same color.

The randomness of the landing of the ball is determined by the mechanical construction of the elements making up the entire roulette wheel. The bowl of the roulette game is machined smooth, covered with veneer, painted with polyester varnish, and polished. Ball stops are added to the bowl to interrupt the travel of the ball in hopes of making the ball travel in a random pattern. These ball stops are adjusted by the manufacturer of the roulette wheel and may need further adjustments when the roulette wheel is put into service. The separator ring and the attached numbers ring are machined and balanced to eliminate any non-random ball movements. The ball itself is machined smooth and may have as specified mass. The installation of the roulette wheel requires that the system be set perfectly level. This is a process that is required if the roulette wheel is also moved to a new location within the casino.

Despite the fact that the roulette wheel is designed to randomize results, it is well known that an experienced roulette dealer can locate or "hit" a section or group of numbers on the wheel. This is possible since dealers determine the speed of the ball and of the wheel. In the typical course of spending eight hours a day, five days a week for years in a row, dealers develop a great deal of experience and technique. Many dealers become capable of locating a specific section or even perhaps hitting a specific number. This is possible despite the presence of the ball stop.

Additionally, European wheels generally give a house advantage of 2.70%. With American wheels, all bets except the five number bets have a house advantage of 5.26%. A dealer need only be able to hit just one particular side of a wheel to alter the odds. The only safeguard that a casino has to achieve an unbiased result in the movement of the ball is to instruct the dealer not to look into the wheel upon spinning. Disadvantages accrue to the house due to lack of randomness.

Furthermore, the conventional roulette gaming machine may rotate the roulette wheel at a fixed rotational speed in each roulette game. Thus, skilled players can roughly predict a next winning number on the basis of the arrangement of the roulette wheel at the time of launching the ball.

Casinos have also tried to achieve randomness by changing the amount of air pressure used to eject the balls, using different types and/or sized balls, and/or changing the spin direction of the ball and/or roulette wheel. As the roulette wheel is played, the ball impacts parts and wears them away. Physical degradation of the roulette wheel occurs over time through constant use such that the ball may wear a path on the roulette wheel and/or the ball may become worn. This may change the random distribution of the ball making the game predictable. The game must now be replaced. Casinos monitor the outcome of all games to determine if a roulette wheel needs to be replaced due to wear. This in itself is an expensive process both in the monitoring of all the wheels in the casino and the replacement of the roulette wheels as needed.

BRIEF DESCRIPTION OF THE INVENTION

The invention provides for the use of a random number generator in a roulette wheel to play a game of roulette. The gaming apparatus may have a random number generator, a roulette wheel, and means for controlling the roulette wheel to indicate a first winning number corresponding to a first random number generated by the random number generator. The roulette wheel may have a top ring, outer ring, separator ring, and an inner ring and each ring may be decoupled from each outer to spin in different directions.

In another embodiment, the gaming apparatus may have a roulette wheel having an separator ring configured to rotate inside an outer ring, at least one motor coupled to the roulette wheel to spin the roulette wheel, a processor coupled to the motor to initiate and halt the motor, a random number generator coupled to the processor to generate a plurality of numbers, and at least one sensor coupled to the roulette wheel and processor to determine a position of a roulette ball, wherein the processor is configured to determine the location of the roulette ball and control the roulette wheel to indicate a first winning number corresponding to a first random number generated by the random number generator.

The invention also provides for a method for generating a random number in a roulette game. The method provides for generating at least one random number from a random number generator, rotating a roulette wheel, spinning a roulette ball into the roulette wheel, detecting the location of the roulette ball in the roulette wheel when the roulette ball comes to a stop, and ceasing rotation of the roulette wheel to indicate a first winning number corresponding with a first random number generated by the random number generator.

The present invention provides other hardware configured to perform the methods of the invention, as well as software stored in a machine-readable medium (e.g., a tangible storage medium) to control devices to perform these methods.

These and other features of the present invention will be presented in more detail in the following detailed description of the invention and the associated figures.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Embodiments are described herein in the context of a random number generator based roulette wheel. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figures 1A, 1B, 1C:
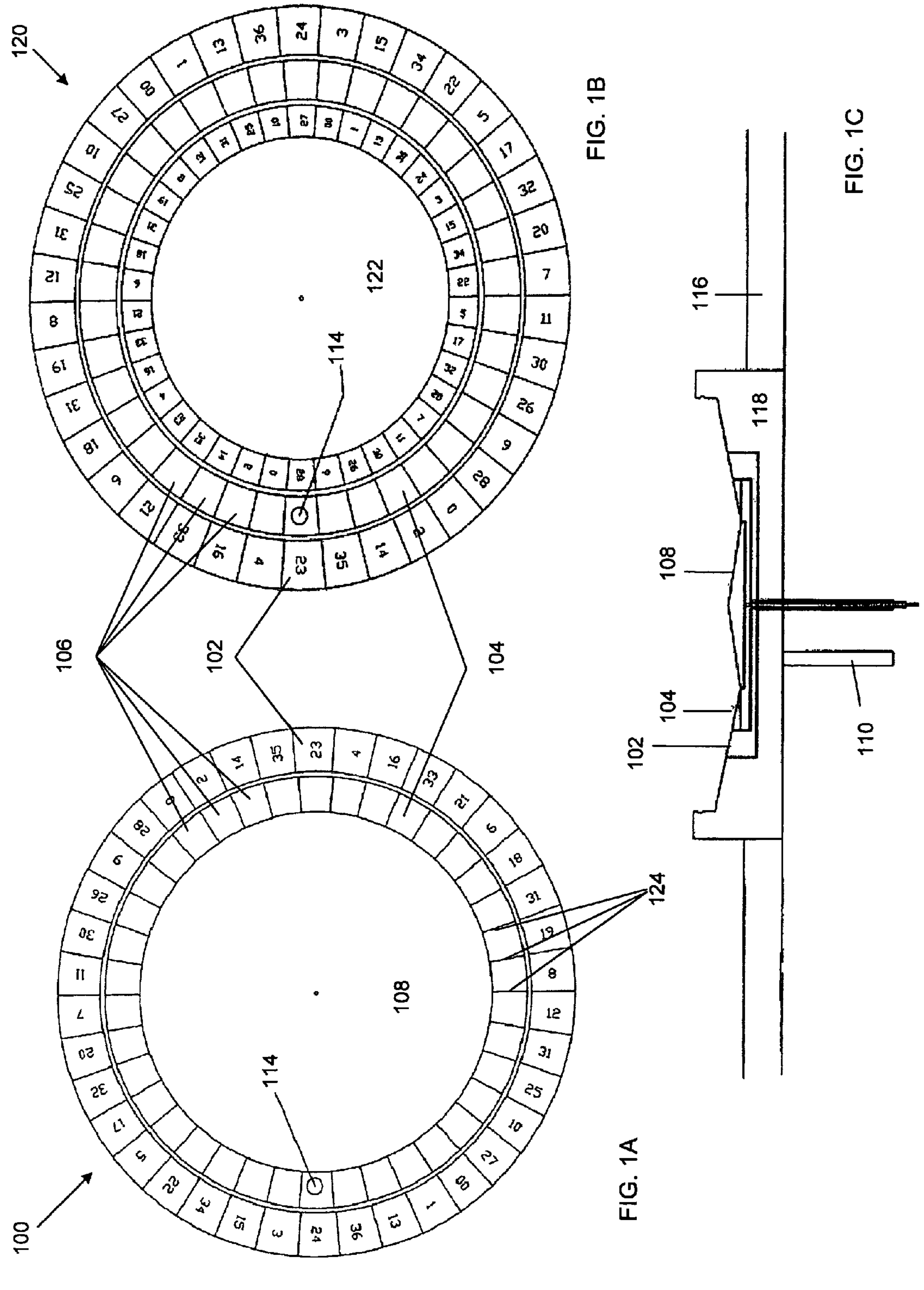
FIGS. 1A, 1B, and 1C illustrate exemplary embodiments of a roulette wheel.

The invention provides for the use of a random number generator in a roulette wheel to play a game of roulette. Since parts of a roulette wheel are well known, only a brief description will be provided herein to prevent obfuscation of the present invention. FIGS. 1A, 1B, and 1C illustrate exemplary embodiments of a roulette wheel. Referring now to FIGS. 1A and 1C, a top and side view, respectively, of a roulette wheel. The roulette wheel 100 may be set into a bowl 118. The wheel 100 may have an outer ring 102, a separator ring 104, and an inner ring 108 all rotating around a common axis. The separator ring 104 may be configured to rotate inside the outer ring 102. The outer ring 102 may have a first plurality of numbers displayed therein as illustrated in FIG. 1A. The separator ring 104 further comprises a plurality of slots 106 for receiving the roulette ball 114. The plurality of slots 106 may correspond to one of the first plurality of numbers on the outer ring 102. The slots 106 may be separated by separators 124 extended outwardly from the separator ring 104. However, the separators 124 may not be necessary as further discussed below.

FIG. 1B is another exemplary embodiment of a roulette wheel. The roulette wheel 102, may have an inner ring 122 having a second plurality of numbers displayed therein to provide players with a variety of wagering options and opportunities to collect large payouts. The inner ring 122 may be decoupled from the separator ring 104 and be configured to rotate inside the separator ring 104. Each of the plurality of slots 106 may also correspond to one of the second plurality of numbers on the inner ring 122 in addition to the first plurality of numbers on the outer ring 102. The inner ring 122 is illustrated with the use of numbers similar to the outer ring 102. However, the use of numbers on the outer ring 102 and/or inner ring 122 is not intended to be limiting as other applications may be used. For example, the outer ring 102 and/or inner ring 122 may have symbols or blanks rather than numbers written therein. The symbol may represent the amount of winning—for example, one position may be "×10" which represents that all bets on the table are multiplied by 10.

In use, the outer ring 102, separator ring 104, and inner ring 108, 122 may rotate clockwise or counterclockwise. Each ring may rotate in the same or different direction. For example, the outer ring 102 and the inner ring 108, 122 may rotate in the same direction, but in a different direction than the separator ring 104.

Figure 2:
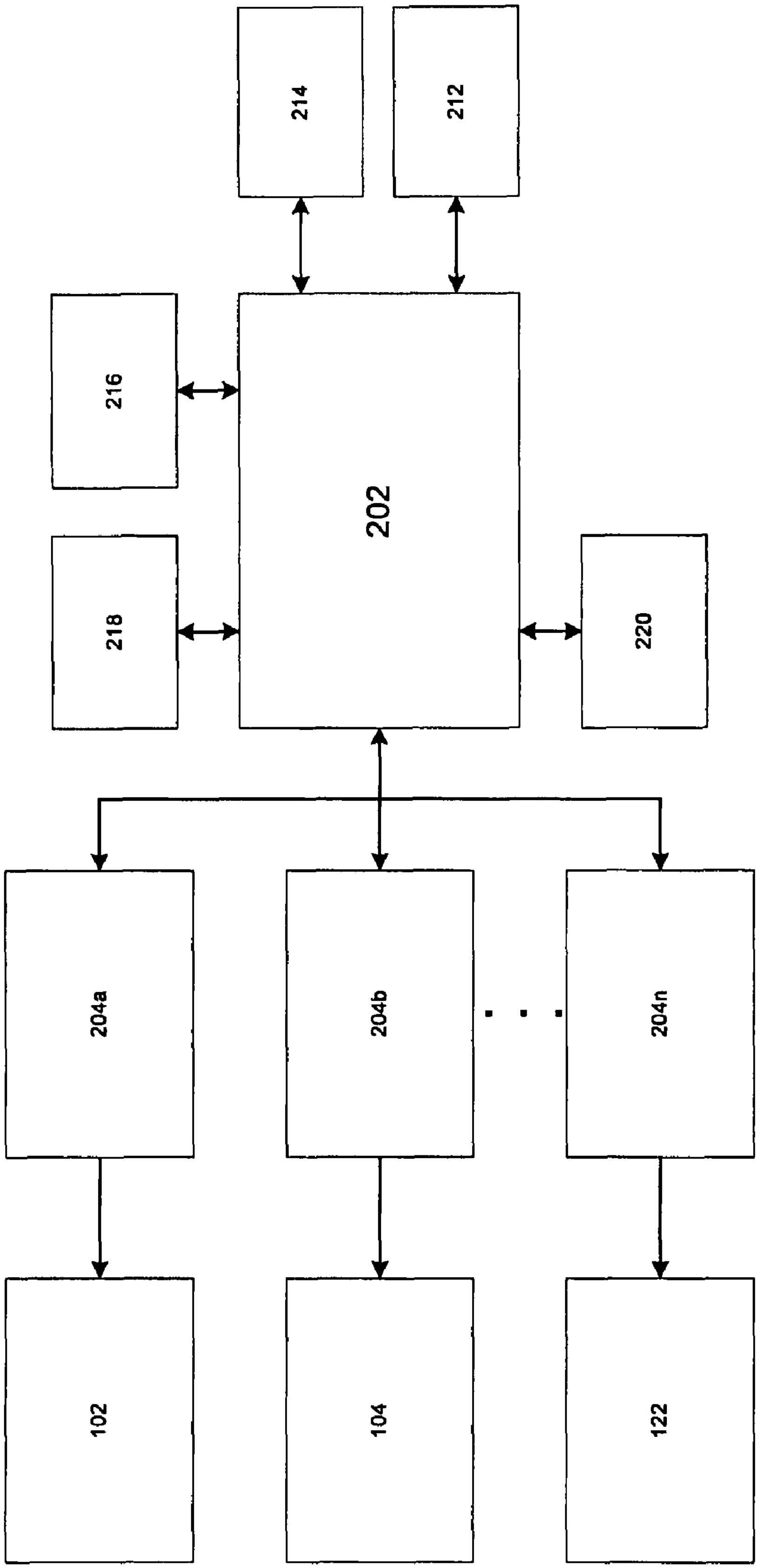
FIG. 2 is a block diagram of the random number generator based roulette wheel.

FIG. 2 is a block diagram of the random number generator based roulette wheel. A gaming computer may have a processor 202 coupled to various devices such as a random access memory (RAM) 212, input device 216, sensor 218, motors 204*a*, 204*b*, 204*n* (where n is an integer), and display 220. Although illustrated coupled to a few devices, it is not intended to be limiting as those of ordinary skill in the art will realize that the processor 202 may be coupled to any other devices as necessary such as an air compressor, random number generator 214, and the like. RAM 212 may be used to store any necessary software or data, such as for calculating the speeds to rotate the inner ring 108, 122, separator ring 104, and/or outer ring 102, determining the location of the roulette ball 114, and the like. The processor may use a software algorithm that may generate 1 of 37 or 1 of 38 random outcomes. Software algorithms to generate random numbers are known and will not be discussed in detail herein to prevent obfuscation of the present invention. However, in one embodiment, the software algorithm may use registers with specific feedback points in the registers to generate the random numbers. Alternatively, a random number generator 214 may be used to generate the random winning numbers used to play the game of chance. The sensor 218 may detect the location of the roulette ball 114 as further discussed in detail below.

The processor 202 may be communicatively coupled to motors 204*a*, 204*b*, 204*n*. The motors 204*a*, 204*b*, 204*n* may be coupled to the roulette wheel to rotate the wheel. The motors 204*a*, 204*b*, 204*n* may be any known motor, e.g., a stepper motor, able to increase and decrease the speed of the roulette wheel. With reference to FIG. 1A, motor 204*a* may be coupled to the outer ring 206 and motor 204*b* may be coupled to separator ring 104. With reference to FIG. 1B, motor 204*a* may be coupled to the outer ring 102, motor 204*b* may be coupled to separator ring 104, and motor 204*n* may be coupled to inner wheel 122. The motors 204*a*, 204*b*, 204*n* may be removably attached to mounting bracket 110. The speed and rotation direction of motors 204*a*, 204*b*, 204*n* may be controlled by the processor 202.

The speed and rotation direction of motors 204*a*, 204*b*, 204*n* may be determined based on the location of the roulette ball 114. Once the roulette ball is received in one of the slots 106, one or more sensors 218 may be used to detect the location of the roulette ball 114. A sensor 218 may be positioned on the roulette wheel in a location that will detect the roulette ball, such as between the separator ring 104 and outer ring 106. Alternatively, a sensor 281 may not be positioned directly on the roulette wheel, but instead may be positioned close enough to the roulette wheel to detect the location of the roulette ball 114. The sensor 218 may include any known sensor such as a mechanical sensor, an electrical sensor, a camera, a magnetic sensor, an optical sensor such as an infrared (IR) sensor, and the like. For exemplary purposes, the sensor may be a photo diode, such as a TO-18 package, used with an IR light emitting diode (LED) having a bundle of fiber optic fibers to direct the IR LED. The IR LED may generate an IR light source to reflect off the roulette ball and be received by the photo diode to determine the slot location of the roulette ball 114.

Figure 3:
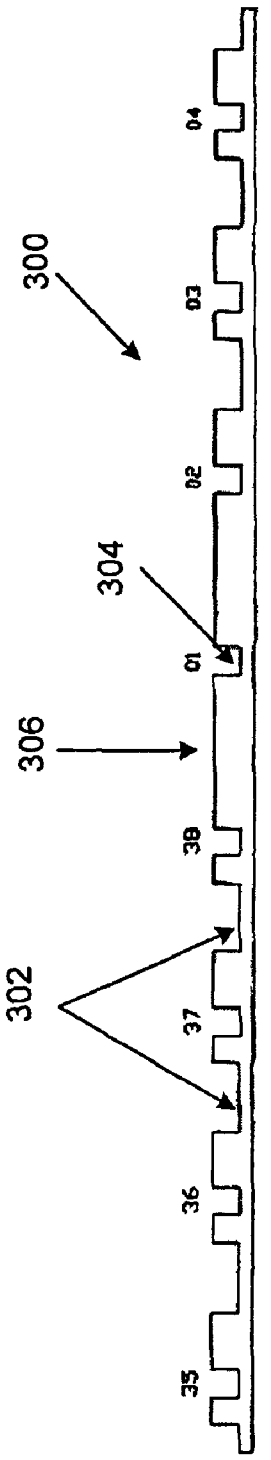
FIG. 3 illustrates an exemplary roulette encoder wheel.

FIG. 3 illustrates an exemplary roulette encoder wheel. An encoder wheel 300, may also be used to further aid in the calculation of the location of the slot the roulette ball and numbers on the inner and outer rings. The encoder wheel may be attached to the underside of the separator ring 104 and outer ring 102. If the double roulette wheel is used, the encoder wheel may also be attached to the underside of the inner ring 122.

The encoder wheel 300 may be made of any durable material, such as plastic or metal, and may have a plurality of notches 302. Each notch 302 may correspond to a number on the outer and inner ring. Alternatively, the notch 302 may correspond to a slot on the separator ring. For example, notch 304 may correspond to the number "01" on the outer ring and inner ring. A notch is not necessary to represent each number on the outer and/or inner ring. Only a few notches are necessary, such as between numbers 35 and 04 as illustrated in FIG. 3. The location between two notches, such as between 01 and 38, may be used a reference or "home" position 306. Once the "home" position 306 is located, the processor 202 may extrapolate the location of the other numbers on the outer and inner ring.

The encoder wheel 300 may be used with a sensor, such as a photo-interrupter to detect the location of the notches 302. The photo-interrupter may also be removably coupled to the underside of the roulette wheel. The photo-interrupter may be any known photo-interrupter such as GP1A50HR made by Sharp.

Once the location of the roulette ball slot is determined, the location of the home position 306 is determined on the outer and/or inner ring, and a plurality of random numbers are obtained from the random number generator, the processor may control and adjust the speed of the outer ring, inner ring, and separator ring to match the location of the slot to the random number on the outer and/or inner ring.

In another embodiment, the separator 104 may not have any separators illustrated in FIG. 1A. As such, the sensor 218 may be a plurality of electromagnets coupled to the underside of each of the slots. Once the random winning number is generated, the electromagnet under the slot corresponding to the winning number on the outer and/or inner ring may be activated to attract the roulette ball. The processor may then control the spin of the outer ring, separator ring, and inner ring to stop at the random winner number. In another embodiment, only one electromagnet may be required wherein the ball will always stop in the same slot. The processor may then control the spin of the outer ring, separator ring, and inner ring to stop at the random winner number.

Figure 4A:
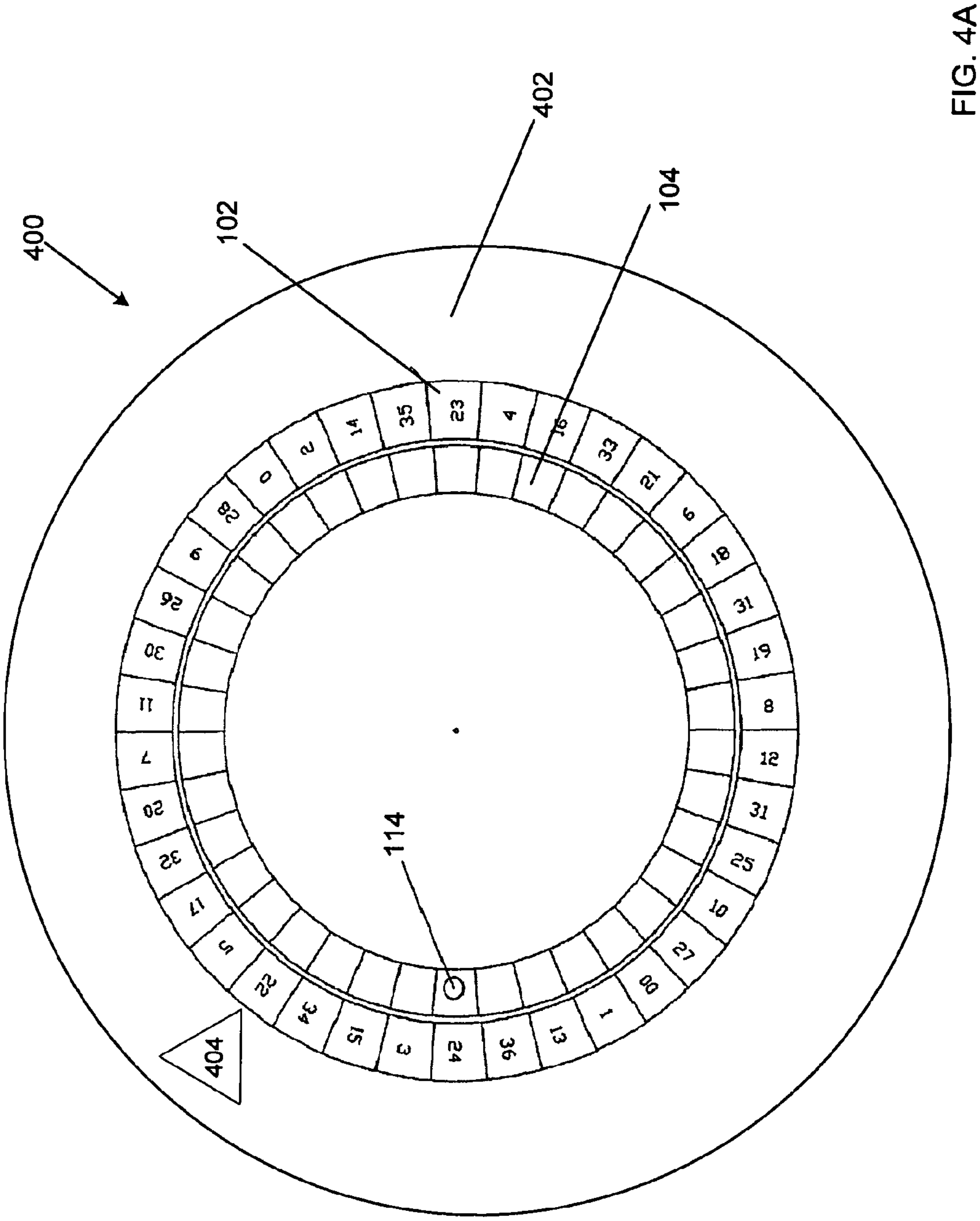
FIGS. 4A-4C illustrates an exemplary embodiment of the random number generator based roulette wheel.
Figure 4B:
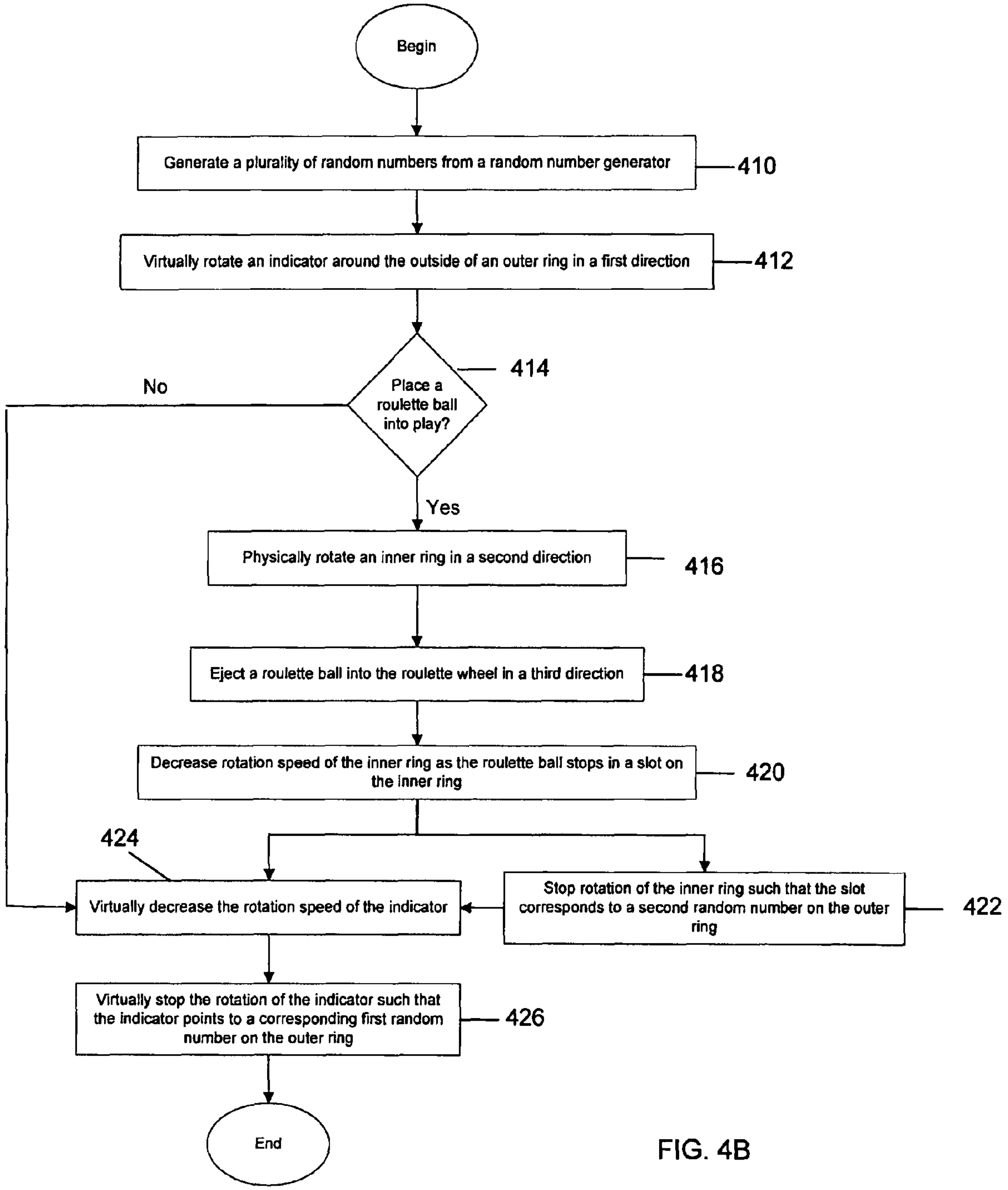
Figure 4C:
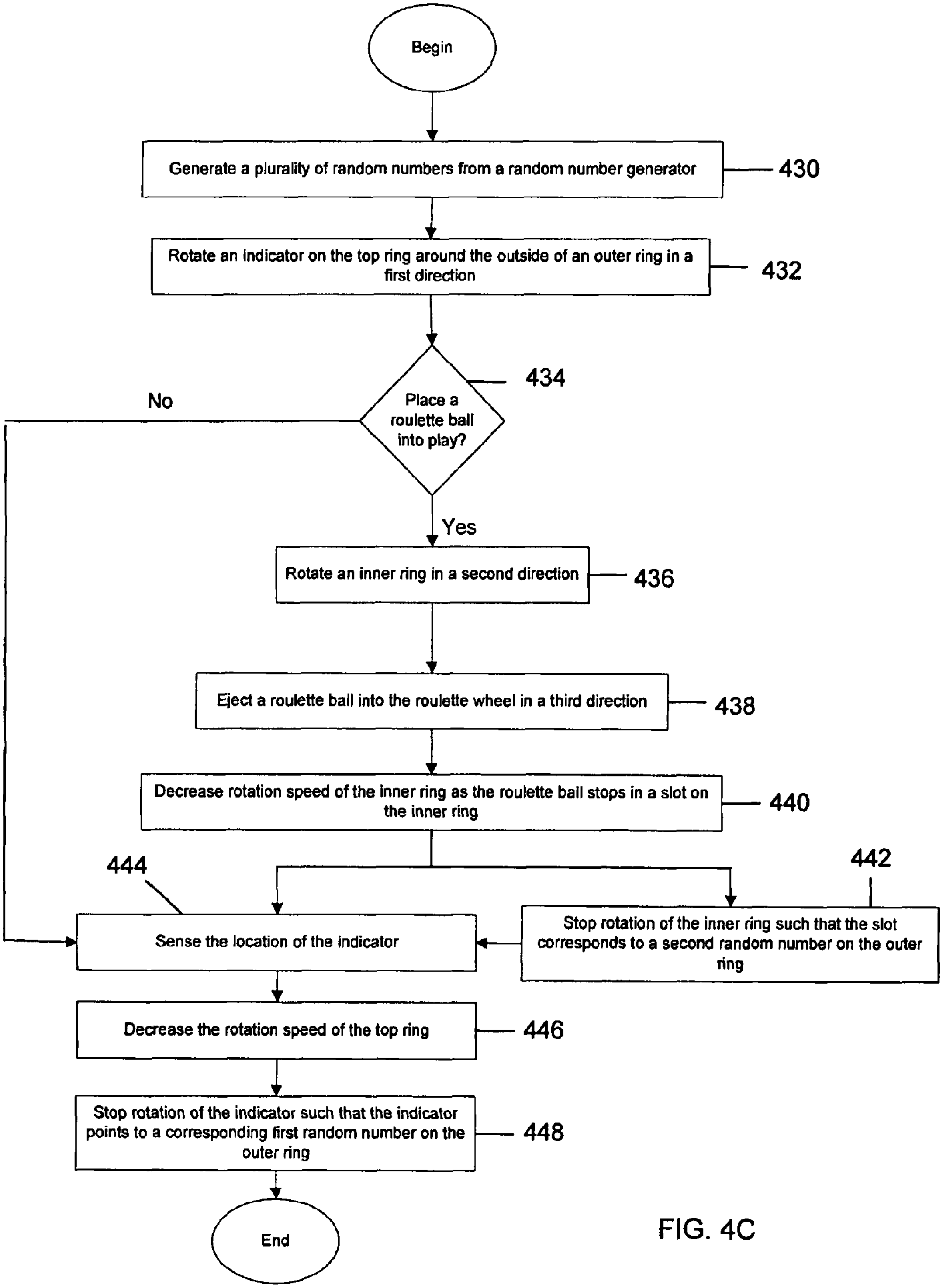

FIGS. 4A-4C illustrates an exemplary embodiment of the random number generator based roulette wheel. Referring to FIGS. 4A and 4B, the roulette wheel 400 may comprise a top ring 402 that may or may not be configured for actual rotation. The top ring 402 may be any bistable electrophoretic display, such as electronic paper. The top ring 402 may be used to display an arrow, pointer, or any other indicator 404 that virtually rotates at a predetermined speed. Accordingly, while some implementations of the invention may involve physically rotating the top ring 402, the capability for virtual rotation makes such implementations optional and not mandatory. In one example, as illustrated in the flow diagram of FIG. 4B, the random number generator may generate a plurality of random numbers at 410. The indicator 404 may virtually rotate in a first direction several times around the outside of the outer ring 102 at 412. The indicator 404 may rotate in a direction or same different from the rotational direction of the outer ring 102.

As illustrated in FIG. 4A, the indicator 404 may be used in addition to the roulette ball 114 to play the game of chance. However, the indicator may also be used in place of or as a substitute to the roulette ball. If the roulette ball 114 is placed into play at 414, the inner ring 104 may be physically rotated in a second direction at 416. The roulette ball 114 may be ejected into the roulette wheel 400 in a third direction at 418. The direction the roulette ball 114 is ejected may be the same or different from the rotation direction of the inner ring 104. After a while, the rotation speed of the inner ring 104 may be decreased as the roulette ball 114 stops in a slot at 420. Simultaneously, the rotation speed of the indicator 404 may be virtually decreased at 424. The rotation of the inner ring 104 may be stopped such that the slot corresponds to a second random number on the outer ring 102 at 422. The rotation of the indicator 404 may be virtually stopped such that the indicator 404 points to a corresponding first random number on the outer ring 102 at 426.

In another exemplary embodiment as illustrated in FIG. 4C, the top ring 402 may have an actual physical indicator 404 and can be configured to rotate outside the outer ring 102. A plurality of random numbers may be generated by a random number generator at 430. The indicator on the top ring may be rotated around the outside of the outer ring 102 in a first direction at 432. Similar to the embodiments discussed above, the top ring 402 may have a motor to control the speed and rotation of the top ring 402. If the roulette ball 114 is placed into play at 434, the inner ring 104 may be physically rotated in a second direction at 436. The roulette ball 114 may be ejected into the roulette wheel 400 in a third direction at 438. The direction the roulette ball 114 is ejected may be the same or different from the rotation direction of the inner ring 104. After a while, the rotation speed of the inner ring 104 may be decreased as the roulette ball 114 stops in a slot at 440.

Simultaneously, a sensor may be used to detect the location of the indicator 202 at 444 and the rotation speed of the top ring 402 may be decreased at 446. The rotation of the top ring 402 and indicator 404 may be stopped such that the indicator points to a corresponding first random number on the outer ring at 448.

If a malfunction or tilt occurs, the game may be declared void. There are several ways a malfunction may occur. The game computer may fail to control the rotation of the top ring, outer ring, separator ring, and/or inner ring. The game computer may also fail or is unable to detect the roulette ball or indicator. All bets may be returned to the players and no outcome of the game may be displayed. The roulette may continuously turn without stopping in the tilt state.

Figure 5:
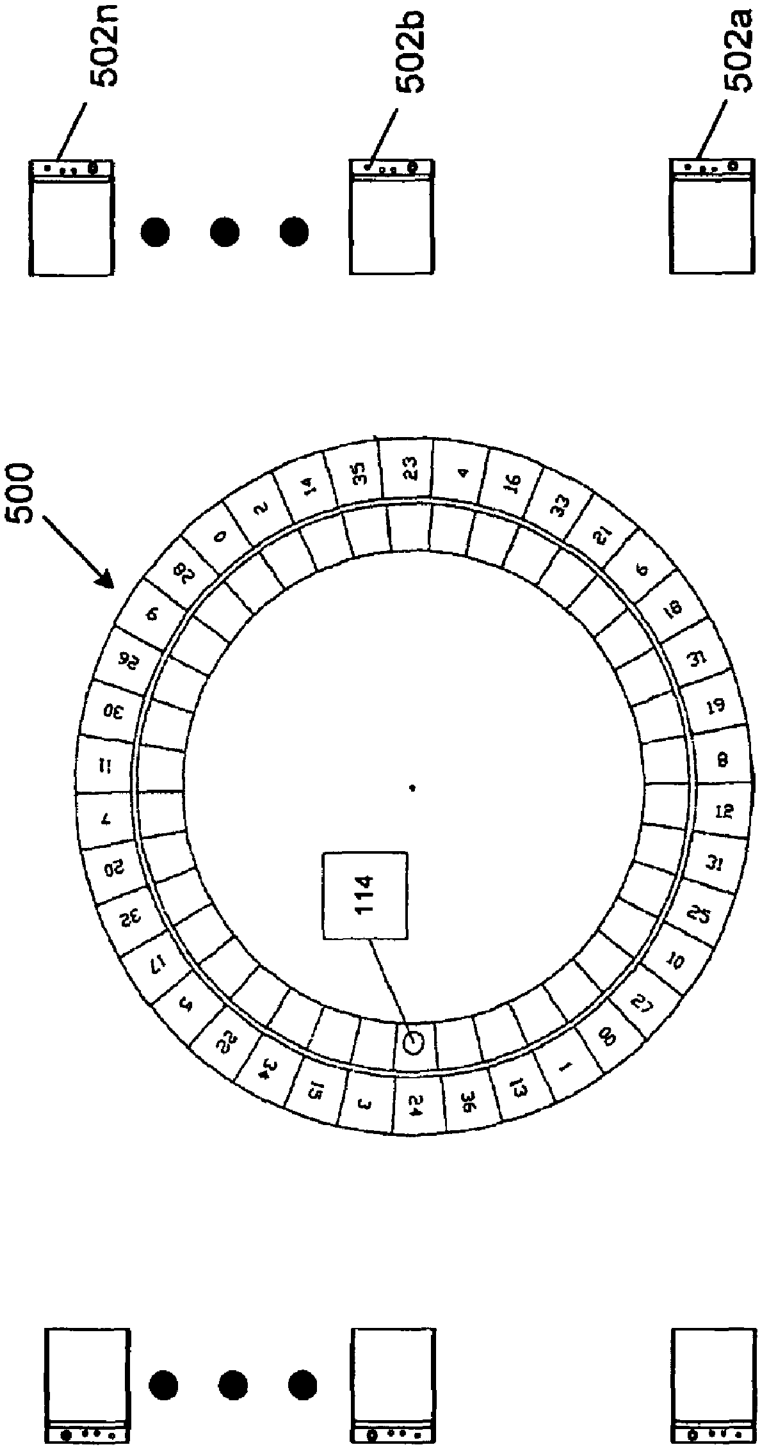
FIG. 5 illustrates a diagram of an exemplary embodiment of a roulette game played with a plurality of remote player stations.

The roulette game may be played utilizing remote player stations to bet and/or display game outcomes. A malfunction may occur in communications between the game computer and the remote player station computer. Should this occur, then all bets are returned to the player since the player station may be unable to process the win or loss without the random number that was generated for that game. FIG. 5 illustrates a diagram of an exemplary embodiment of a roulette game played with a plurality of remote player stations. An electronic roulette wheel 500 may be positioned in the center surrounded by a plurality of remote player station computers 502*a*, 502*b*, 502*n*. The remote player station computers may be any known gaming machine having a display, player input devices, player tracking devices, lights, speakers, touch screen displays, and the like. The plurality of remote player station computers may be positioned anywhere around the electronic roulette wheel 500 such that the players are able to see the numbers around the roulette wheel 500. The electronic roulette wheel may be communicatively coupled to each of the remote player station computers 502*a*, 502*b*, 502*n* to perform a variety of gaming functions such as place bets, stop all bets, view game outcomes, and the like. For example, the players may be able to view the game outcome on the actual roulette wheel 500 or a closer view of the roulette wheel may be transmitted on the display of the remote player stations 502*a*, 502*b*, 502*n*.

Figure 6:
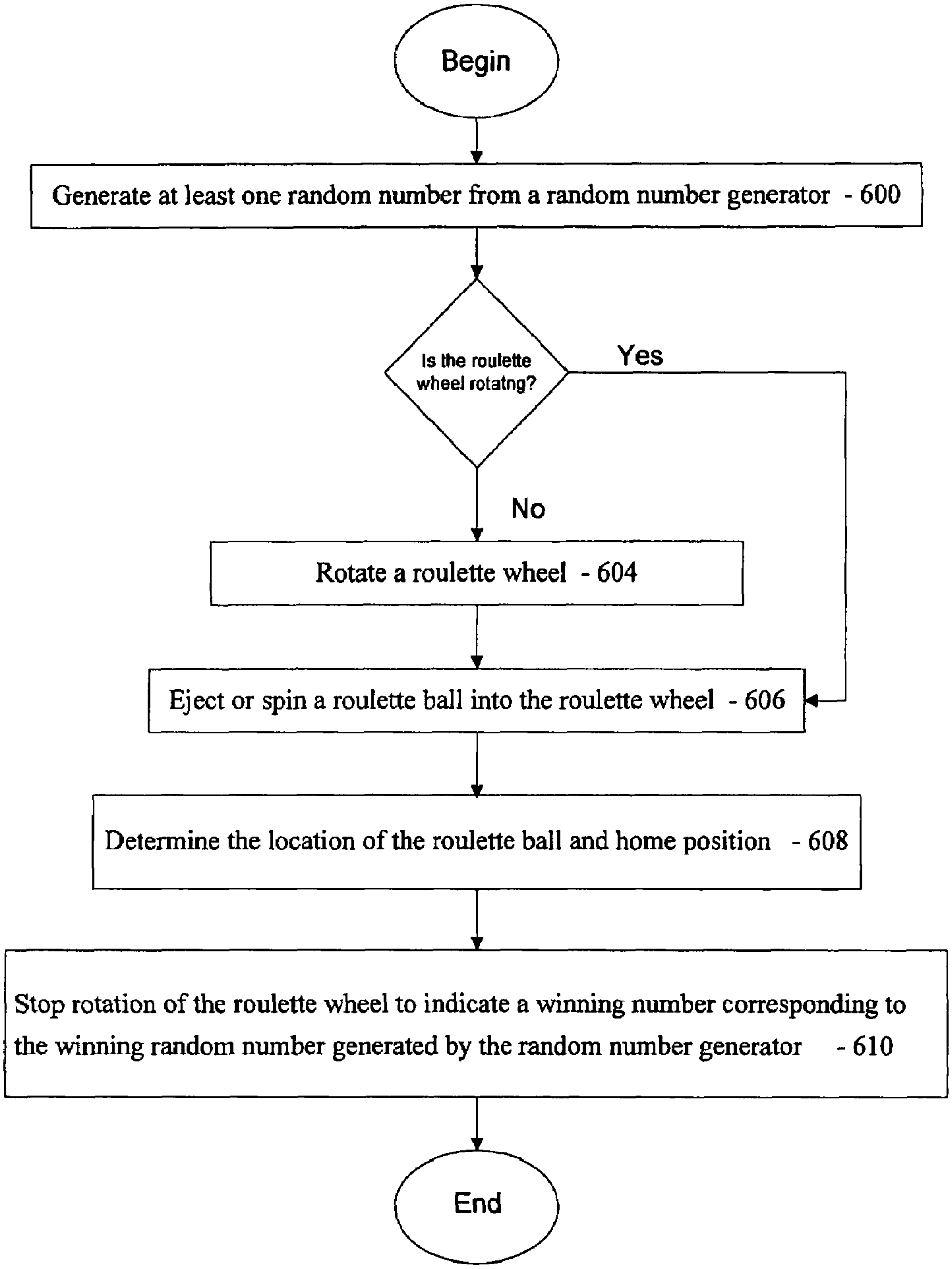
FIG. 6 illustrates a flow diagram of a method for generating a random number in a roulette game.

FIG. 6 illustrates a block diagram of a method for generating a random number in a roulette game. At least one random number may be generated from a random number generator at 600 to indicate a winning number. If the roulette is not spinning at 602, the roulette wheel may be rotated at 604. If the roulette wheel is spinning at 602, a roulette ball may be ejected into the roulette wheel at 606. The wheel may have an outer ring, a separator ring, and an inner ring all rotating around a common axis. The separator ring may be configured to rotate inside the outer ring. The outer ring may have a first plurality of numbers displayed therein. The separator ring further comprises a plurality of slots for receiving the roulette ball. The plurality of slots may correspond to one of the first plurality of numbers on the outer ring. The slots may be separated by separators extended outwardly from the separator ring. However, the separators may not be necessary as further discussed below.

The inner ring may also have a second plurality of numbers displayed therein to provide players with a variety of wagering options and opportunities to collect large payouts. The inner ring may be decoupled from the separator ring and be configured to rotate inside the separator ring. Each of the plurality of slots may also correspond to one of the second plurality of numbers on the inner ring in addition to the first plurality of numbers on the outer ring.

In use, the outer ring, separator ring, and inner ring may rotate clockwise or counterclockwise. Each ring may rotate in the same or different direction. For example, the outer ring and the inner ring may rotate in the same direction, but in a different direction than the separator ring.

The location of the roulette ball and the home position may be determined at 608, e.g., when the roulette ball comes to a stop in a slot. Alternatively, predictive techniques may be used to determine in advance which slot will receive the roulette ball. Some such techniques may involve determining a ball position and/or trajectory when the ball has slowed to a threshold speed. Some such implementations provide magnets or the like to influence which slot will receive the ball, e.g., as described elsewhere herein. A gaming computer may have a processor coupled to various devices such as a RAM, random number generator, input device, sensor, motors, and a display. Although illustrated coupled to a few devices, it is not intended to be limiting as those of ordinary skill in the art will realize that the processor may be coupled to any other devices as necessary such as an air compressor.

The motors may be coupled to the roulette wheel to rotate the wheel. Each of the outer, separator, and inner rings may each have a motor coupled thereto. The motors may be any known stepper motor able to increase and decrease the speed of the roulette wheel. The speed and rotation direction of the motors may be controlled by the processor.

The speed and rotation direction of motors may be determined based on the location of the roulette ball. Once the roulette ball is received in one of the slots, a sensor positioned on the roulette wheel may be used to detect the location of the roulette ball. The sensor may be positioned in a location that will detect the roulette ball, such as between the separator ring and outer ring. The sensor may be any known sensor such as an optical sensor, IR sensors, and the like. For exemplary purposes, the sensor may be a photo diode, such as a TO-18 package, used with an IR LED having a bundle of fiber optic fibers to direct the IR LED. The IR LED may generate an IR light source to reflect off the roulette ball and be received by the photo diode to determine the slot location of the roulette ball.

An encoder wheel, may also be used to further aid in the calculation of the location of the slot the roulette ball and numbers on the inner and outer rings. The encoder wheel may be attached to the underside of the separator ring and outer ring. If the double roulette wheel is used, the encoder wheel may also be attached to the underside of the inner ring.

The encoder wheel may be made of any durable material, such as plastic or metal, and may have a plurality of notches. Each notch may correspond to a number on the outer and inner ring. Alternatively, the notch may correspond to a slot on the separator ring. A notch is not necessary to represent each number on the outer and/or inner ring. Only a few notches is necessary, such as between numbers "35" and "04". The location between two notches, such as between 01 and 38, may be used a reference or "home" position. Once the "home" position is located, the processor may extrapolate the location of the other numbers on the outer and inner ring.

The encoder wheel may be used with a sensor, such as a photo-interrupter, to detect the location of the notches. The photo-interrupter may also be removably coupled to the underside of the roulette wheel. The photo-interrupter may be any known photo-interrupter such as GP1A50HR made by Sharp.

Once the location of the roulette ball slot is determined, the location of the home position is determined on the outer and/or inner ring, and a plurality of random numbers are obtained from the random number generator, the processor may control and adjust the speed of the outer ring, inner ring, and separator ring to match the location of the slot to the random number on the outer and/or inner ring. The rotation of the roulette wheel may be stopped at 610 to indicate the winning number corresponding with a random number generated by the random number generator.

In another embodiment, the separator may not have any separators as discussed above. As such, the sensor may be a plurality of electromagnets coupled to the underside of each of the slots. Once the random winning number is generated, the electromagnet under the slot corresponding to the winning number on the outer and/or inner ring may be activated to attract the roulette ball. The processor may then control the spin of the outer ring, separator ring, and inner ring to stop at the random winner number. In another embodiment, only one electromagnet may be required wherein the ball will always stop in the same slot. The processor may then control the spin of the outer ring, separator ring, and inner ring to stop at the random winner number.

EXAMPLE

Figure 7:
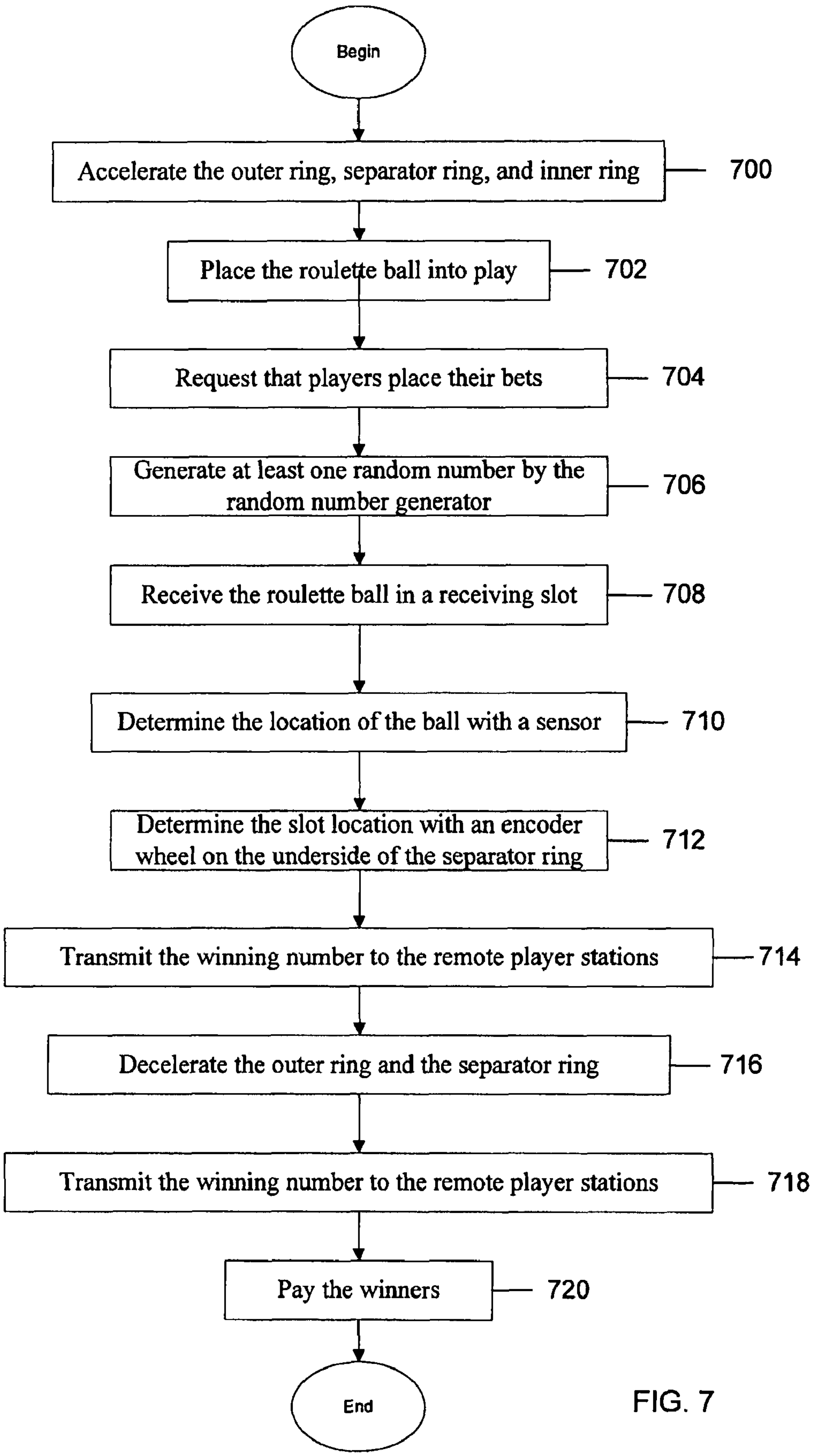
FIG. 7 illustrates a flow diagram of another embodiment of a method for generating a random number in a roulette game.

The example provided herein is for exemplary purposes only and not intended to be limiting. FIG. 7 illustrates a flow diagram of an exemplary embodiment of a game play for the game of roulette using a random number generator.

The game computer signals the stepper motor controller to accelerate the outer ring, separator ring, and inner ring as applicable at 700. The direction of rotation is sent from the game computer to the stepper motor controller. The rate of acceleration may be sent from the game computer to the stepper motor controller or it may be determined by reference to, e.g., an acceleration table built within the stepper motor controller. The position of the numbers ring is monitored by the game computer via the encoder wheels located on the underside of the rings.

The direction of rotation of the rings can be the same or opposite of each other. If the separator ring is rotating in the same direction as the outer ring then the separator ring will not be rotated at the same speed in this example. It will be rotated at a slower or faster speed. If the rings are rotating in opposite directions then the speed of rotation does not matter.

The roulette ball is placed into play at 702. A dealer may manually spin the roulette ball in the roulette wheel. Alternatively, the ball may be automatically put into play. In some such implementations, the roulette ball is ejected into the roulette wheel through the use of an air compressor. The ball may be rotated clockwise or counterclockwise.

Players are requested to place their bets at 704. If using a remote player stations (illustrated in FIG. 5) to place bets, an audio and/or visual call may be sent from the game computer to all of the player stations alerting the players to “place all bets” or the like. After some amount of time has elapsed the dealer will alert the players that “no more bets” will be accepted. Alternatively, the electronic device may make another audio and/or visual call, sent from the game computer, to all of the player stations alerting the players that “no more bets” will be accepted. This ends the betting round.

At least one random number may be generated by the random number generator at 706. This determines the position on the outer ring and separator ring where the ball will stop. For some implementations having a numbered outer ring and a numbered inner ring, two random numbers may be generated. The second random number would, in this example, determine the relative positions of the inner ring and the separator ring.

The roulette ball rotates around the roulette wheel and as it decreases in speed it contacts the ball stops located around the perimeter of the bowl. This causes an interruption in the movement of the ball.

The roulette ball travels down across the outer ring and contacts the separator ring. The ball bounces off the separators until the ball is caught in one of the receiving slots at 708.

A sensor, which in this example includes a laser beam assembly located at the top of the bowl, is used by the game computer to determine if the ball has stopped bouncing and in which slot the ball is received at 710.

Once the game computer determines the location of the slot on the separator ring, it may interrogate the encoder wheel on the underside of the separator ring to calculate the slot that the ball is in at 712.

The game computer then uses the encoder wheel on the underside of the outer ring to find the position of the winning number that was selected randomly by the game computer at 714.

If the outer ring and the separator ring are rotating in the same direction, the game computer decelerates both the outer ring and the separator ring at 714 until the position of the slot where the roulette ball came to a stop and the winning number represented on the outer ring are lined up with each other. This may be achieved by decelerating the two rings at different rates and then locking the rotational speed of the two rings together. The two rings may then be slowed down or stopped together. If the numbers ring and the separator ring are rotating in different direction, then one of the rings is stopped, i.e. the outer ring and the separator ring may then be stopped when the ball is lined up with the outer ring. Both of these methods achieve the same result, i.e., having the ball line up with the randomly selected winning number generated by the random number generator.

The game computer then transmits the winning number to the player stations at 718 via RF energy, Ethernet, USB, fiber optic, or some other transmission scheme.

Figure 8:
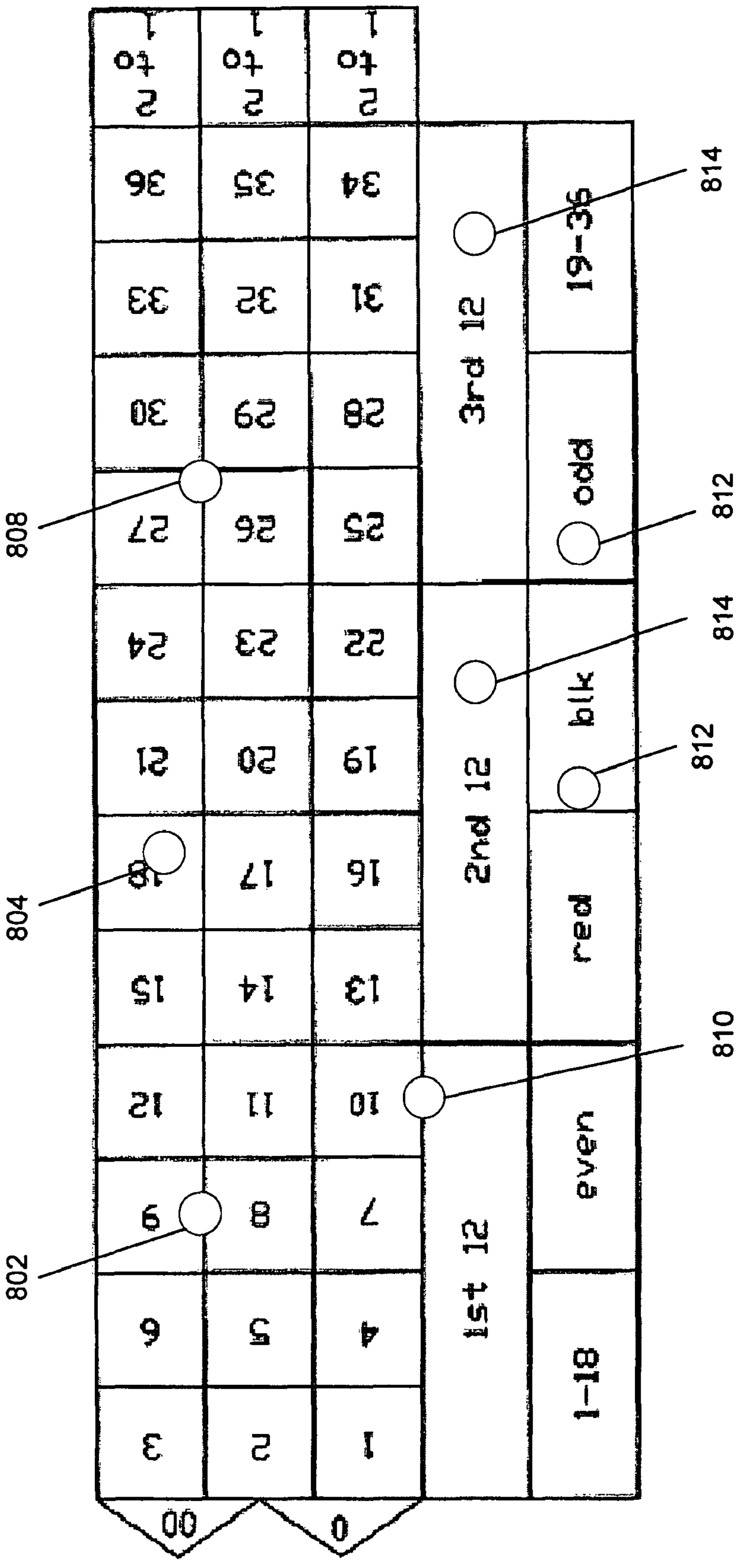
FIG. 8 illustrates an exemplary payout table for the roulette game.

The winners are paid at 720 according to certain payouts, e.g., as illustrated in FIG. 8. For exemplary purposes only, payouts for bets at 802 may pay 18:1, 804 may pay 36:1, and bets at 808 may pay 9:1. Bets at 810 may pay 12:1, 812 may pay 1:1, and at 814 may be 2:1. Additionally, if a double roulette wheel is used, payouts may pay 650:1 if the winning random number is bet to result from the inner or the outer ring. Alternatively, a bet may pay 1300:1 if the winning random number is bet to result from the outer and inner ring.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A gaming apparatus, comprising:

a random number generator configured to generate at least one random number;

a roulette wheel;

means for rotating the roulette wheel;

means for spinning a roulette ball into the roulette wheel;

means for detecting a location of the roulette ball; and means for controlling the roulette wheel based on the location of the roulette ball to indicate a first winning number corresponding with a first random number generated by the random number generator.

2. The gaming apparatus of claim 1, further comprising means for controlling the roulette wheel to indicate a second winning number corresponding with a second random number generated by the random number generator.

3. The gaming apparatus of claim 1, wherein the roulette wheel comprises:

an outer ring indicating a first plurality of numbers; and a separator ring configured to rotate inside the outer ring, the separator ring comprising a plurality of slots for receiving the roulette ball, each of the plurality of slots corresponding to one of the first plurality of numbers, wherein the detecting means is capable of detecting a receiving slot of the separator ring that received the roulette ball, and wherein the controlling means is capable of controlling the separator ring to match the receiving slot with the first winning number on the outer ring.

4. The gaming apparatus of claim 1, wherein the roulette wheel comprises:

an inner ring indicating a first plurality of numbers; and a separator ring configured to rotate outside the inner ring, the separator ring comprising a plurality of slots for receiving the roulette ball, each of the plurality of slots corresponding with one of the first plurality of numbers, wherein the detecting means is capable of detecting a receiving slot of the separator ring that received the roulette ball, and wherein the controlling means is capable of controlling the separator ring to match the receiving slot with the first winning number on the inner ring.

5. The gaming apparatus of claim 1, wherein the roulette wheel comprises a separator ring comprising a plurality of slots for receiving the roulette ball;

wherein the detecting means is capable of detecting a receiving slot of the separator ring that has received the roulette ball; and wherein the controlling means comprises a display device configured to display numbers adjacent the separator ring and to display the first winning number adjacent to the receiving slot.

6. The gaming apparatus of claim 2, wherein the roulette wheel comprises:

an outer ring indicating a first plurality of numbers;

an inner ring indicating a second plurality of numbers; and a separator ring configured to rotate inside the outer ring and outside the inner ring, the separator ring comprising a plurality of slots for receiving the roulette ball, wherein the controlling means is capable of controlling the separator ring, the inner ring, and the outer ring to match the receiving slot with the first winning number on the outer ring and the second winning number on the inner ring.

7. The gaming apparatus of claim 3, wherein the separator ring and the outer ring are both configured to rotate clockwise or counterclockwise.

8. The gaming apparatus of claim 3, wherein the separator ring is configured to rotate in a first direction and the outer ring is configured to rotate in a second direction.

9. The gaming apparatus of claim 3, wherein the detection means comprises a plurality of sensors, each of the plurality of sensors disposed in a slot of the separator ring.

10. The gaming apparatus of claim 1, wherein the detection means comprises an optical detector for detecting a position of the roulette ball.

11. The gaming apparatus of claim 5, wherein the display device comprises electronic paper.

12. The gaming apparatus of claim 6, wherein the inner ring is configured to rotate independently of the outer ring.

13. The gaming apparatus of claim 6, wherein the separator ring and the inner ring are configured to rotate clockwise or counterclockwise.

14. The gaming apparatus of claim 6, wherein the separator ring is configured to rotate in a first direction and the inner ring is configured to rotate in a second direction.

15. The gaming apparatus of claim 1, wherein the roulette wheel comprises:

a top ring having a pointer;

an outer ring indicating a plurality of numbers configured to rotate inside the top ring; and a separator ring configured to rotate inside the outer ring, the separator ring comprising a plurality of slots for receiving the roulette ball, each of the plurality of slots corresponding with one of the plurality of numbers, wherein the controlling means comprises:

means for controlling the top ring to match the first winning number on the outer ring to the pointer on the top ring, and means for controlling the separator ring to match the receiving slot with a second winning number on the outer ring.

16. The gaming machine of claim 15, wherein the top ring is configured to rotate in a first direction, the outer ring is configured to rotate in a second direction, and the separator ring is configured to rotate in a third direction.

17. A gaming apparatus, comprising:

a roulette wheel having a separator ring configured to rotate inside an outer ring;

at least one motor coupled to the roulette wheel to spin the roulette wheel;

a processor coupled to the motor to initiate and halt the motor;

a random number generator coupled to the processor to generate a plurality of numbers; and at least one sensor coupled to the roulette wheel and processor to determine a position of a roulette ball;

wherein the processor is configured to determine the location of the roulette ball and control the roulette wheel to indicate a first winning number corresponding to a first random number generated by the random number generator.

18. The gaming apparatus of claim 17, the separator ring comprising a plurality of slots for receiving the roulette ball and the outer ring indicating a first plurality of numbers.

19. The gaming apparatus of claim 17, further comprising a first motor coupled to the outer ring and a second motor coupled to the separator ring.

20. The gaming apparatus of claim 19, wherein the outer ring and the separator ring are configured to rotate clockwise or counterclockwise.

21. The gaming apparatus of claim 19, wherein the outer ring is configured to rotate in a first direction and the separator ring is configured to rotate in a second direction.

22. The gaming apparatus of claim 19, further comprising an inner ring indicating a second plurality of numbers, the inner ring configured to rotate inside the separator ring.

23. The gaming apparatus of claim 22, further comprising a third motor coupled to the inner ring.

24. The gaming apparatus of claim 22, wherein the processor is configured to determine the location of the roulette ball and control the roulette wheel to indicate a second winning number from the second plurality of numbers corresponding to a second random number generated by the random number generator.

25. The gaming apparatus of claim 17, wherein the at least one sensor is an optical sensor to detect the position of the roulette ball in the separator ring.

26. The gaming apparatus of claim 18, wherein the at least one sensor further comprises an electromagnet coupled to an underside of each of the plurality of slots.

27. The gaming apparatus of claim 18, wherein the outer ring further comprises a display configured to display the first plurality of numbers.

28. The gaming apparatus of claim 27, wherein the display is made of electronic paper.

29. A method for generating a random number in a roulette game, comprising:

generating at least one random number from a random number generator;

rotating a roulette wheel;

spinning a roulette ball into the roulette wheel;

detecting the location of the roulette ball in the roulette wheel when the roulette ball comes to a stop;

ceasing rotation of the roulette wheel to indicate a first winning number corresponding with a first random number generated by the random number generator.

30. The method of claim 29, wherein the rotating further comprises rotating a separator ring in a first direction and the outer ring in a second direction, the separator ring configured to spin inside the outer ring, wherein the outer ring indicates a first plurality of numbers and the separator ring comprises a plurality of slots to receive the roulette ball.

31. The method of claim 30, further comprising spinning the separator ring in a first direction and the outer ring in a second direction.

32. The method of claim 30, further comprising ceasing rotation of the outer ring and the separator ring to indicate the first winning number.

33. The method of claim 30, further comprising spinning an inner ring inside the separator ring, the inner ring having a second plurality of numbers.

34. The method of claim 33, further comprising ceasing rotation of the inner ring to indicate a second winning number corresponding to a second random number generated by the random number generator.

35. The method of claim 29, wherein the spinning further comprises injecting air to spin the roulette ball in the roulette wheel.

36. The method of claim 29, wherein the detecting further comprises engaging an electromagnet coupled to the roulette wheel.

37. The method of claim 29, wherein the ceasing further comprises detecting a tilt state.

* * * * *